Patented July 18, 1933

1,918,328

UNITED STATES PATENT OFFICE

HARRY L. FISHER, OF LEONIA, NEW JERSEY, ASSIGNOR TO THE NAUGATUCK CHEMICAL COMPANY, OF NAUGATUCK, CONNECTICUT, A CORPORATION OF CONNECTICUT

PROCESS OF VULCANIZING RUBBER

No Drawing.   Application filed August 20, 1931.   Serial No. 558,334.

This invention relates to processes of vulcanizing rubber and similar vulcanizable materials and to the resulting products. More particularly it has to do with new vulcanizing agents and their use in rubber.

The materials known to cause the vulcanization of rubber are numerous, chief among them being sulphur. This material, however, while universally used, is not suitable for every occasion. Sulphur vulcanizates, for instance, tarnish metals such as copper, silver, etc., and where such vulcanizates are used for rubber-metal objects, for instance composite rubber and metallic cloth or fabric articles, rubber-insulated wire, head lights, silverware, copperware, etc., their disadvantage is manifest. Furthermore the use of sulphur as a vulcanizing agent, in the absence of vulcanization accelerators, requires a long time to vulcanize rubber and rubber-like bodies.

An object of this invention is to obviate the use of sulphur and accelerators, by supplying a vulcanizing agent that overcomes the above disadvantages and provides a series of products having a wide range of desirable physical characteristics. Further objects and advantages will be apparent from the hereinafter set forth description.

The new vulcanizing agents are broadly quinone compounds containing halogen attached to the quinone nucleus, and more particularly such compounds derived from p-benzoquinone. Some of the compounds operate favorably as vulcanizing agents either with or without the aid of an oxidizing agent, while others require the aid of an oxidizing agent. The preferred oxidizing agents are those containing oxygen and a multi-valent metal, for example, lead peroxide, manganese dioxide, mercuric oxide, lead chromate, etc., in which the multivalent metal combined with the oxygen is in a higher state of oxidation.

The halogen substitution and addition products of the quinone compounds are designated "quinone haloids" and are to be understood as including halogenated quinones, halogenated quinhydrones, halogenated hydroquinones, addition products of a quinone and a halogen, or any mixture thereof.

The halogenated quinones may be added directly to the rubber or rubber mix or alternatively may be formed in the rubber by adding the corresponding halogenated hydroquinones, quinhydrones, or quinone halides, and an oxidizing agent to the rubber and vulcanizing.

In every case the actual vulcanizing agent appears to be a halogenated quinone, whether added to the rubber as such, or formed in the rubber by the oxidation of a "quinone haloid" of a reduced type, such as a halogenated hydroquinone. During the course of vulcanization by means of a halogenated quinone in the absence of an oxidizing agent, one-half of the quinone added becomes reduced to the corresponding halogenated hydroquinone, is then incapable of combining with the rubber, and is extractable by acetone. In the presence of an oxidizing agent, however, such hydroquinone is immediately oxidized, whereby the quinone is continuously regenerated, thus making possible the effective use as a vulcanizing agent of all the quinone originally added. In such case the acetone extract of the resulting vulcanized product contains substantially no halogen, indicating that substantially all of the halogenated quinone originally added is combined with the rubber.

Examples of halogenated quinones are, monochloro-p-benzo quinone, 2,3-dichloro-p-benzoquinone, 2,5-dichloro-p-benzoquinone, 2,6-dichloro - p - benzoquinone, trichloro - p - benzoquinone, tetrachloro - p - benzoquinone (chloranil), monobromo-p-benzoquinone, 2, 5-dibromo-p-benzoquinone, 2,6-dibromo - p - benzo quinone, tribromo-p-benzoquinone, tetrabromo-p-benzoquinone (bromanil), trichloro-p-toluquinone, tetrabromo - o - benzoquinone, tetraiodo-p-benzoquinone. The materials used may be pure or impure and contain varying percentages of halogen. Mixtures of the higher chlorinated p-benzoquinones containing tetra-chloro-p-benzoquinone in varying amounts and having melting points between approximately 195° and approximately 285° C. are especially desirable since they may be prepared in finely divided form, are non-volatile, show no poisonous properties, and may be used to vulcanize rubber in the presence or absence of an oxidizing agent.

The compounds may be prepared in any known manner.

The following is illustrative of a new and efficient process for preparing halogenated quinones, the preparation of tetrachloro-p-benzoquinone being given as an example:

110 grams (1 mol) of hydroquinone are added to 3300 cc. of dilute hydrochloric acid (1:1) in a flask. Twenty grams of chromic anhydride are added to the reaction mixture, whereupon a dense crop of quinhydrone crystals appear. Then chlorine is bubbled through the well-stirred solution at room temperature for about 2 hours, after which time external heat is applied. Heating and chlorination are continued until the fine yellow precipitate which has been formed has risen to the top of the reaction mixture. The chlorination has by then (about 10 hrs.) proceeded through several stages of lower chlorinated products to a conclusion, forming finally tetrachloro-p-benzoquinone which is in the form of the said yellow precipitate. This material is separated by filtration, washed and dried. The filtrate if desired may be used as a reaction medium for the preparation of more tetrachloro-p-benzoquinone. The yield is nearly quantitative and the material melts between 267–275° C. When pure it has a melting point of about 289° C. The process may be varied to form lower chlorinated products as will be apparent and other agents such as potassium permanganate, sodium or potassium dichromate with or without sulphuric acid, may be used instead of the chromic anhydride. Ferric chloride has been found effective in carrying the reaction as far as the formation of tetrachlorohydroquinone in practically quantitative yields, substantially none of the corresponding chlorinated quinones being formed.

The examples given below are illustrative of the invention, but are not to be construed as limiting thereof (parts are by weight):

Example 1

| Rubber | 100 | 100 |
|---|---|---|
| Tetrachloro-p-benzoquinone | 5 | 4 |

| Vulcanized in a press at 141° C. | T | E | T | E |
|---|---|---|---|---|
| 15 min | 900 | 880 | 850 | 940 |
| 90 min | 1,025 | 890 | 900 | 950 |

T = tensile strength, lbs. per sq. in.
E = % elongation at break.

Example 2

| Rubber | 100 | 100 | 100 |
|---|---|---|---|
| Monochloro-p-benzoquinone | 5 | 10 | 15 |

| Vulcanized in a press at 141° C. | T | E | T | E | T | E |
|---|---|---|---|---|---|---|
| 30 min | | | 518 | 860 | 1,257 | 780 |
| 60 min | | | 978 | 860 | 1,190 | 870 |
| 90 min | 255 | 1,030 | 894 | 800 | 1,275 | 780 |

Example 3

| Rubber | 100 | 100 |
|---|---|---|
| Tetrabromo-p-benzoquinone | 5 | 10 |

| Vulcanized in a press at 141° C. | T | E | T | E |
|---|---|---|---|---|
| 5 min | 1053 | 900 | | |
| 10 min | 1102 | 770 | 1256 | 740 |
| 20 min | 1032 | 960 | 1271 | 830 |

The corresponding quinhydrones may be used in place of the halogenated quinones, and behave as if the corresponding quinone and hydroquinone were present.

Example 4

The effectiveness of the vulcanizing agents is enhanced in the presence of oxidizing agents (as indicated more fully below), such for example as lead peroxide:

| Rubber (pale crepe) | 100 | 100 |
|---|---|---|
| Tetrachloro-p-benzoquinone | 5 | 5 |
| Lead peroxide | | 10 |

| Vulcanized in a press 15 min. at 141° C. | T | E | T | E |
|---|---|---|---|---|
| | 897 | 880 | 2247 | 580 |

The new vulcanizing agents are also effective in the presence of rubber compounding materials as illustrated below:

Example 5

| Pale crepe | 100 |
|---|---|
| Tetrachloro-p-benzoquinone (M. P. 284° C.) | 5 |
| Whiting | 100 |

| Vulcanized in a press at 141° C. | T | E |
|---|---|---|
| 30 min | 1900 | 610 |
| 60 min | 2166 | 620 |
| 90 min | 2345 | 510 |

Example 6

| Pale crepe | 100 | Vulcanized in a press at 141° C. | | |
|---|---|---|---|---|
| | | | T | E |
| Chlorinated p-benzoquinone (M. P. 225-7° C. 53.02% Cl) | 5 | 15 min | 3005 | 610 |
| | | 30 min | 3098 | 640 |
| | | 60 min | 3045 | 580 |
| Zinc oxide | 100 | 90 min | 3030 | 570 |

Example 7

| Pale crepe | 100 | Vulcanized in a press at 141° C. | | |
|---|---|---|---|---|
| | | | T | E |
| Chlorinated p-benzoquinone (M. P. 195-215° C. 49.05% Cl) | 4 | 15 min | 2207 | 780 |
| | 4 | 60 min | 2226 | 790 |
| Zinc oxide | 5 | 90 min | 2267 | 730 |
| Barytes | 40 | | | |
| Boric acid | 5 | | | |

Example 8

| | | Wrapped around a mandrel and vulcanized in soapstone at 141° C. | | |
|---|---|---|---|---|
| Pale crepe | 100.0 | | T | E |
| Chlorinated p-benzoquinone (M. P. 195–215° C. 49.05% Cl) | 5.5 | 60 min | 1792 | 460 |
| Whiting | 100.0 | 120 min | 1593 | 410 |
| Lamp black | 2.2 | 180 min | 1647 | 440 |
| Pine tar | 8.9 | | | |
| Paraffin | 1.1 | | | |
| Lead peroxide | 22.2 | | | |

Example 9

| | | Vulcanized in a press at 141° C. | | |
|---|---|---|---|---|
| Pale crepe | 100.0 | | T | E |
| Chlorinated p-benzoquinone (M. P. 225–7° C., 53.02% Cl) | 4 | 15 min | 2173 | 570 |
| | | 30 min | 2357 | 560 |
| Red oxide of iron | 2 | 60 min | 2167 | 540 |
| | | 90 min | 2288 | 560 |
| Silica dust | 30 | | | |
| Clay | 25 | | | |

Example 10

| | | Vulcanized in a press at 145° C. | | |
|---|---|---|---|---|
| Smoked sheet | 100 | | T | E |
| Chlorinated p-benzoquinone (M. P. 195–215° C., 49.05% Cl.) | 5 | 30 min | 3505 | 440 |
| Carbon black | 50 | 60 min | 3537 | 390 |
| Pine tar | 5 | 90 min | 3433 | 360 |
| Palm oil | 1 | | | |
| Lead peroxide | 15 | | | |

Example 11

| | | Vulcanized in a press at 141° C. | | |
|---|---|---|---|---|
| Pale crepe | 100 | | T | E |
| Trichloro-p-benzoquinone | 4 | 30 min | 1337 | 550 |
| Zinc oxide | 100 | 60 min | 1792 | 610 |
| | | 90 min | 1787 | 610 |

Example 12

| | | Vulcanized in a press at 141° C. | | |
|---|---|---|---|---|
| Pale crepe | 100 | | T | E |
| 2,5-dichloro-p-benzoquinone | 5 | 30 min | 1315 | 550 |
| Zinc oxide | 100 | 60 min | 1578 | 570 |
| | | 90 min | 1664 | 580 |

Example 13

| | | Vulcanized in a press at 141° C. | | |
|---|---|---|---|---|
| Pale crepe | 100 | | T | E |
| 2,6-dichloro-p-benzoquinone | 5 | 30 min | 928 | 610 |
| Zinc oxide | 100 | 60 min | 1205 | 640 |
| | | 90 min | 1163 | 630 |

Example 14

| | | Vulcanized in a press at 141° C. | | |
|---|---|---|---|---|
| Pale crepe | 100 | | T | E |
| Trichloro-p-toluquinone | 5 | 30 min | 452 | 650 |
| Zinc oxide | 100 | 60 min | 1019 | 640 |
| | | 90 min | 1039 | 620 |

Example 15

| | | | | |
|---|---|---|---|---|
| Pale crepe | 100 | | 100 | |
| Tetrachloro-p-benzoquinone | 5 | | 4 | |
| Lead peroxide | 20 | | 10 | |
| Litharge | 20 | | 20 | |
| Pine tar | 5 | | 5 | |
| Carbon black | 50 | | 75 | |
| | T | E | T | E |
| 15' at 45# | 3311 | 420 | 2892 | 370 |
| 30' at 45# | 3268 | 380 | 3145 | 370 |
| 60' at 45# | 3425 | 370 | 3068 | 340 |

Example 16

| | | Vulcanized in a press at 141° C. | | |
|---|---|---|---|---|
| Pale crepe | 100 | | T | E |
| Tetraiodo-p-benzoquinone | 10 | | | |
| Zinc oxide | 100 | 120 min | 1052 | 610 |

Examples of halogenated hydroquinones are, monochloro-hydroquinone, 2,5-dichlorohydroquinone, 2,6-dichlorohydroquinone, trichloro-hydroquinone, tetrachloro-hydroquinone, monobromo-hydroquinone, 2,5-dibromo-hydroquinone, 2,6-dibromo-hydroquinone, tribromo-hydroquinone, and tetrabromo-hydroquinone; these products as well as the halogen-addition products such as p-benzoquinone-dichloride and p-benzoquinone-dibromide when used as vulcanizing agents should be used in conjunction with an oxidizing agent such as lead peroxide or the like, thereby effecting the formation of the corresponding halogenated quinone in the rubber before or during vulcanization. Various oxidizing agents other than lead peroxide, e. g. manganese dioxide and mercuric oxide, have been found to function efficiently when used in conjunction with the lower halogenated hydroquinones, particularly with the mono-halogen hydroquinones, as illustrated in Examples 21 and 22 below. The use of such materials is illustrated by the following examples:

Example 17

| | | | | | |
|---|---|---|---|---|---|
| Rubber | 100 | | 100 | | 100 |
| Tetrachloro-hydroquinone | 3 | | 5 | | 5 |
| Lead peroxide | 15 | | 15 | | 5 |
| | T | E | T | E | T | E |
| 30' at 141° C | 2342 | 560 | 1930 | 550 | 395 | 830 |
| 90' at 141° C | 2381 | 550 | 1949 | 530 | 519 | 850 |

Example 18

| Pale crepe | 100 | Vulcanized in a press at 141° C. | | |
|---|---|---|---|---|
| Trichloro-hydroquinone | 4 | | | |
| | | | T | E |
| Lead peroxide | 15 | 15 min | 987 | 720 |
| | | 30 min | 1643 | 650 |
| | | 90 min | 2050 | 600 |

Example 19

| Pale crepe | 100 | Vulcanized in a press at 141° C. | | |
|---|---|---|---|---|
| Trichloro-hydroquinone | 5 | | | |
| Manganese dioxide | 5 | | | |
| | | | T | E |
| | | 30 min | 360 | 970 |
| | | 60 min | 1065 | 830 |
| | | 90 min | 1435 | 800 |

Example 20

| Pale crepe | 100 | Vulcanized in a press at 141° C. | | |
|---|---|---|---|---|
| Tetrabromo-hydroquinone | 6 | | | |
| Lead peroxide | 15 | | | |
| | | | T | E |
| | | 15 min | 588 | 590 |
| | | 60 min | 1147 | 640 |
| | | 90 min | 1703 | 670 |

Example 21

| Pale crepe | 100 | Vulcanized in a press at 141° C. | | |
|---|---|---|---|---|
| Monochloro-hydroquinone | 7.5 | | | |
| Manganese dioxide | 15 | | | |
| | | | T | E |
| | | 30 min | 2167 | 690 |
| | | 60 min | 2184 | 640 |
| | | 90 min | 2181 | 680 |

Example 22

| Rubber | 100 | | 100 | |
|---|---|---|---|---|
| Monobromo-hydroquinone | 5 | | 10 | |
| Manganese dioxide | 10 | | 10 | |
| | T | E | T | E |
| 30' at 141° C | 1185 | 580 | | |
| 90' at 141° C | | | 1817 | 700 |

Example 23

| Pale crepe | 100.0 | Calendered and wrapped around a mandrel, and vulcanized in soapstone at 141° C. | | |
|---|---|---|---|---|
| Tetrachloro-hydroquinone | 5.5 | | | |
| Whiting | 100.0 | | | |
| Lamp black | 2.2 | | | |
| Lead peroxide | 22.2 | | | |
| | | | T | E |
| | | 60 min | 1852 | 410 |
| | | 120 min | 1835 | 390 |
| | | 180 min | 1815 | 390 |

Example 24

| Smoked sheet | 100 | Vulcanized in a press at 141° C. | | |
|---|---|---|---|---|
| Tetrachloro-hydroquinone | 5 | | | |
| | | | T | E |
| Carbon black | 50 | 20 min | 3255 | 440 |
| Lead peroxide | 15 | 40 min | 2920 | 400 |
| Lauric acid | 5 | 60 min | 3173 | 410 |
| | | 90 min | 3367 | 420 |

In place of the halogenated hydro-quinones, salts thereof may be used, such, for example, as the zinc, calcium, magnesium, or sodium salts. Such salts as the mercuric salts may also be used, in which case the salt is self-oxidizing and no additional oxidizing agent is required.

Example 25

| Rubber | 100 | Vulcanized in a press at 141° C. | | |
|---|---|---|---|---|
| p-benzoquinone dichloride | 5 | | | |
| | | | T | E |
| Lead peroxide | 15 | 30 min | 2371 | 780 |
| | | 60 min | 1870 | 720 |
| | | 90 min | 1849 | 700 |

It is believed that the p-benzoquinone dichloride is converted by internal rearrangement into dichloro-hydroquinone, which is then oxidized by the lead peroxide or other oxidizing agent to the corresponding dichloro-p-benzoquinone, in accordance with the following scheme:

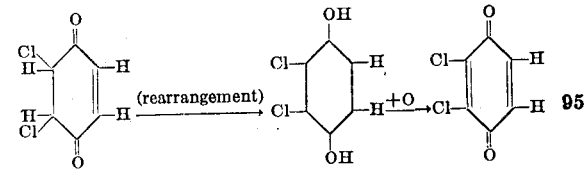

The new vulcanizing agents are effective over a wide range of temperatures, as shown by the following data:

| | A | B | C |
|---|---|---|---|
| Pale crepe | 100 | 100 | 100 |
| Tetrachloro-p-benzoquinone (M. P. 267° C., 54.7% Cl) | 4 | 4 | 4 |
| Zinc oxide | | 100 | 100 |
| Lead perioxide | | | 10 |

Times of vulcanization

| Compound | Temp. of vulcanization | Minutes | | | | | | | | | |
|---|---|---|---|---|---|---|---|---|---|---|---|
| | | 10 | | 20 | | 30 | | 60 | | 120 | |
| | | T | E | T | E | T | E | T | E | T | E |
| A | ° C. | | | | | | | | | | |
| | 108 | | | | | 531 | 9.2 | 890 | 9.8 | 918 | 10.6 |
| | 121 | 768 | 10.1 | 827 | 10.1 | 703 | 9.9 | 587 | 9.4 | 658 | 9.5 |
| | 141 | 885 | 9.6 | 85 | 4.1 | 270 | 6.6 | 1290 | 10.0 | 783 | 8.2 |
| | 153 | 475 | 9.4 | | | | | 777 | 9.9 | 824 | 10.3 |
| | 162 | 793 | 10.1 | 229 | 9.2 | 691 | 10.2 | 649 | 9.9 | 519 | 9.3 |
| B | 108 | | | 521 | 6.8 | 889 | 7.1 | 1656 | 7.5 | 1669 | 7.0 |
| | 121 | 1072 | 7.0 | 1265 | 7.3 | 1711 | 7.5 | 1858 | 7.3 | 2134 | 7.2 |
| | 141 | 1595 | 6.9 | 2022 | 7.1 | 1675 | 6.7 | 1743 | 6.7 | 1855 | 6.8 |
| | 153 | 1608 | 7.1 | 1729 | 6.8 | 1645 | 6.8 | 1855 | 6.8 | 1727 | 6.7 |
| | 162 | 1925 | 7.1 | 1648 | 6.7 | 1573 | 6.5 | 1695 | 6.7 | 1804 | 6.7 |
| C | 108 | 860 | 7.4 | 891 | 6.8 | 1455 | 6.7 | 2202 | 6.8 | 2835 | 6.4 |
| | 121 | 1273 | 8.1 | 1821 | 6.8 | 2503 | 6.8 | 2768 | 6.2 | 3052 | 6.1 |
| | 141 | 1975 | 5.7 | 2867 | 5.9 | 3027 | 5.8 | 2057 | 4.9 | 2502 | 5.1 |
| | 153 | 3082 | 6.6 | 2285 | 5.4 | 2831 | 5.5 | 1509 | 4.2 | 2281 | 5.0 |
| | 162 | 2595 | 5.7 | 2360 | 5.3 | | | 2198 | 5.1 | 1435 | 4.2 |

The higher halogenated products, such as tetrachloro-p-benzoquinone, have been found to effect satisfactory vulcanization even at room temperatures. For example a stock consisting of 100 parts of pale crepe and 5 parts of tetrachloro-p-benzoquinone was calendered to a sheet 0.062 inch in gauge, and was then laid aside at room temperature for several months. At the end of five months the sheet was found to have become well vulcanized having a tensile strength in the direction of the calender grain of 1168 lbs., and an elongation at break of 770%. After a total of 6½ months the tensile strength had increased to 1567 lbs., the elongation being 780%.

The new vulcanizing agents are especially advantageous in the production of vulcanized rubber-coated fabrics wherein the rubber surface is varnished. The life of the varnish, and particularly its resistance to cracking and checking, are greatly increased by virtue of the absence of sulphur. When the rubber compounds contain large proportions of reclaimed rubber, the resulting vulcanizates are superior in physical properties to similar compounds cured with sulphur and accelerators.

A certain amount of blooming in the form of a whitish substance on the surface of vulcanizates attends the use of the higher halogenated quinones, which bloom consists essentially of reduction products, namely, the corresponding halogenated hydroquinones, but this may be obviated by using the hologenated quinone in conjunction with an oxidizing agent such as, for example, lead peroxide, mercuric oxide, etc., which apparently also play the part of activators for the vulcanizing agents. Magnesia, slaked lime, litharge, have also been found effective in preventing formation of such bloom.

Strong alkalies and organic amines, such as sodium hydroxide, aniline, etc., in the absence of oxidizing agents, tend to destroy the vulcanizing activity or effect of the new vulcanizing agents by reacting therewith to form compounds which exhibit little or no vulcanizing action, and this fact should be taken into consideration in designing rubber compounds employing the new vulcanizing agents. Such loss of vulcanizing activity may be obviated by either eliminating such alkalies or amines or limiting their amounts, or by the addition of an oxidizing agent.

Ordinarily 3 to 5 parts of the new vulcanizing agents may be used to effect vulcanization, but this amount may vary in accordance with the type of rubber and compounding ingredients, for example in highly compounded stocks it may be desirable to use as high as 10 parts of the vulcanizing agent.

The new vulcanized products have many of the properties of rubber-sulfur vulcanizates, for example, they possess high tensile strength; they are practically insoluble in the ordinary rubber solvents; they show at 0° C. substantially the same resilience and elongation as at room temperature; and by proper compounding with carbon black, zinc oxide, and/or other fillers they can be made to have high resistance to abrasion and to other destructive influences such as tearing, cutting, flexing, stretching, and oil absorption.

The rubber compounds containing the new vulcanizing agents may be mechanically processed to any desired form or shape, as by calendering, molding, tubing, extruding, etc. Also, latex containing the new vulcanizing agents may be spread, extruded or otherwise treated, before, during or after vulcanization to provide vulcanized rubber coatings, filaments or threads. The threads or filaments may be further used for the production of various composite rubber articles or goods. For example the vulcanized latex threads or filaments may be wound with yarn or thread or other materials for the making of various articles such as gaiters, which employ metal attachments, or intermeshed as by weaving or knitting into association with metallic threads, as in the making of so-called metallic cloths or fabrics. Because the rubber produced is free from sulphur, tarnishing of the metals by the formation of metal sulphides, such as occurs through contact or proximity of the metal to sulphur-containing rubber, is avoided.

The halogenated hydroquinones, in conjunction with oxidizing agents, have been found particularly efficacious for use in latex. They are soluble in the presence of the small amount of ammonia contained in ammonia-preserved latex, and they also assist in the dispersion of the oxidizing agents employed therewith.

When the new vulcanizing agents are employed in the vulcanization of latex as such, the resulting vulcanized latices have the appearance of thixotropic gels, and may be spread or otherwise deposited in known manner and dried to produce coatings of vulcanized rubber.

The materials may be applied for the vulcanization of rubber broadly, including caoutchouc, balata, gutta-percha, synthetic rubber, natural latex or artificially prepared latex, and in conjunction with any of the usual compounding ingredients including softeners, anti-agers, fillers, etc. While the invention has to do with new vulcanizing agents for the vulcanization of rubber, they may be used to supplement the usual vulcanization with sulphur, if desired. Also while certain preferred oxidizing agents have been mentioned herein, other oxidizing agents may be used, for example, red lead oxide, thorium oxide, nickelic oxide, cobaltic oxide, ferric vanadate, ferric phosphate, ferric sulfate, ferric oxalate, ferric benzoate.

With the detailed disclosure above, it will be evident that numerous modifications will suggest themselves to those skilled in the art, without the exercise of invention thereover, and it is not desired to limit the invention otherwise than as set forth in the appended claims.

Having thus described my invention, what I claim and desire to protect by Letters Patent is:

1. A process of producing vulcanized rubber products which comprises effecting vulcanization of the rubber by means of a "quinone haloid" having a single ring structure.

2. A process of producing vulcanized rubber products which comprises effecting vulcanization of the rubber by means of 3–10 parts by weight based on the rubber of a "quinone haloid" having a single ring structure as a vulcanizing agent.

3. A process of producing vulcanized rubber products which comprises effecting vulcanization of the rubber by means of a "quinone haloid" having a single ring structure and an oxidizing agent.

4. A process of producing vulcanized rubber products which comprises effecting vulcanization of the rubber by means of a "quinone haloid" having a single ring structure and an oxidizing agent containing oxygen and a multivalent metal.

5. A process of producing vulcanized rubber products which comprises effecting vulcanization of the rubber by means of 3–10 parts by weight based on the rubber of a quinone compound containing halogen attached to the quinone nucleus as a vulcanizing agent, the temperature of treatment being such as to require not more than about three hours for proper vulcanization of the rubber.

6. A process of producing vulcanized rubber products which comprises effecting vulcanization of the rubber by means of 3–10 parts by weight based on the rubber of a halogenated benzoquinone as a vulcanizing agent, the temperature of treatment being such as to require not more than about three hours for proper vulcanization of the rubber.

7. A process of producing vulcanized rubber products which comprises effecting vulcanization of the rubber by means of 3–10 parts by weight based on the rubber of a chlorinated benzoquinone as a vulcanizing agent, the temperature of treatment being such as to require not more than about three hours for proper vulcanization of the rubber.

8. A process of producing vulcanized rubber products which comprises effecting vulcanization of the rubber by means of 3–10 parts by weight based on the rubber of halogenated-p-benzoquinone as a vulcanizing agent the temperature of treatment being such as to require not more than about three hours for proper vulcanization of the rubber.

9. A process of producing vulcanized rubber products which comprises effecting vulcanization of the rubber by means of 3–10 parts by weight based on the rubber of chlorinated p-benzoquinone as a vulcanizing agent, the temperature of treatment being such as to require not more than about three hours for proper vulcanization of the rubber.

10. A process of producing vulcanized rubber products which comprises effecting vulcanization of the rubber by means of 3–10 parts by weight based on the rubber of chlorinated p-benzoquinone melting between approximately 195° C. and approximately 289° C., the temperature of treatment being such as to require not more than about three hours for proper vulcanization of the rubber.

11. A process of producing vulcanized rubber products which comprises effecting vulcanization of the rubber by means of 3–10 parts by weight based on the rubber of tetrachloro-p-benzoquinone, the temperature of treatment being such as to require not more than about three hours for proper vulcanization of the rubber.

12. A process of producing vulcanized rubber products which comprises effecting vulcanization of the rubber by means of chlorinated p-benzoquinone melting between approximately 195° C. and approximately 289° C., and an oxidizing agent containing oxygen and a multivalent metal.

13. A process of producing vulcanized rubber products which comprises effecting vulcanization of the rubber by means of chlorinated p-benzoquinone melting between approximately 195° C. and approximately 289° C., and lead peroxide.

14. A process of producing vulcanized rubber products which comprises effecting vulcanization of the rubber by means of a halogenated hydroquinone and an oxidizing agent.

15. A process of producing vulcanized rubber products which comprises effecting vulcanization of the rubber by means of a chlorinated hydroquinone and an oxidizing agent.

16. A process of producing vulcanized rubber products which comprises effecting vulcanization of the rubber by means of tetrachloro-hydroquinone and an oxidizing agent.

17. A process of producing vulcanized rubber products which comprises effecting vulcanization of the rubber by means of a halogenated hydroquinone and an oxidizing agent containing oxygen and a multivalent metal.

18. A process of producing vulcanized rubber products which comprises effecting vulcanization of the rubber by means of a chlorinated hydroquinone and an oxidizing agent containing oxygen and a multivalent metal.

19. A process of producing vulcanized rubber products which comprises effecting vulcanization of the rubber by means of tetrachlorohydroquinone and an oxidizing agent containing oxygen and a multivalent metal.

20. A process of producing vulcanized rubber products which comprises effecting vulcanization of the rubber by means of tetrachlorohydroquinone and lead peroxide.

21. A process of producing vulcanized rubber products which comprises effecting vulcanization of the rubber by means of an addition product of a halogen and a quinone having a single ring structure, and an oxidizing agent.

22. A process of producing vulcanized rubber products which comprises effecting vulcanization of the rubber by means of an addition product of a halogen and a quinone having a single ring structure, and an oxidizing agent containing oxygen and a multivalent metal.

23. A process of producing vulcanized rubber products which comprises effecting vulcanization of the rubber by means of an addition product of a halogen and p-benzoquinone, and an oxidizing agent.

24. A process of producing vulcanized rubber products which comprises effecting vulcanization of the rubber by means of an addition product of chlorine and p-benzoquinone, and an oxidizing agent.

25. A process of producing vulcanized rubber products which comprises effecting vulcanization of the rubber by means of an addition product of a halogen and p-benzoquinone, and an oxidizing agent containing oxygen and a multivalent metal.

26. A process of producing vulcanized rubber products which comprises effecting vulcanization of the rubber by means of an addition product of chlorine and p-benzoquinone, and an oxidizing agent containing oxygen and a multivalent metal.

27. A process of producing vulcanized rubber products which comprises effecting vulcanization of the rubber by means of p-benzoquinone dichloride and an oxidizing agent containing oxygen and a multivalent metal.

28. A process of producing vulcanized rubber products which comprises effecting vulcanization of the rubber by means of p-benzoquinone dichloride and lead peroxide.

29. A vulcanized rubber product obtained according to the process set forth in claim 2.

30. A vulcanized rubber product obtained according to the process set forth in claim 5.

31. A vulcanized rubber product obtained according to the process set forth in claim 6.

32. A vulcanized rubber product obtained according to the process set forth in claim 7.

33. A vulcanized rubber product obtained according to the process set forth in claim 8.

34. A vulcanized rubber product obtained according to the process set forth in claim 9.

35. A vulcanized rubber product obtained according to the process set forth in claim 10.

36. A vulcanized rubber product obtained according to the process set forth in claim 11.

37. A vulcanized rubber product obtained according to the process set forth in claim 13.

38. A vulcanized rubber product obtained according to the process set forth in claim 15.

39. A vulcanized rubber product obtained according to the process set forth in claim 18.

40. A vulcanized rubber product obtained according to the process set forth in claim 22.

41. A vulcanized rubber product obtained according to the process set forth in claim 23.

42. A vulcanized rubber product obtained according to the process set forth in claim 24.

43. A vulcanized rubber product obtained according to the process set forth in claim 26.

44. A composite rubber and metal article in which the rubber has been vulcanized by means of a "quinone haloid" having a single ring structure.

45. A fabric material comprising metallic threads associated with latex threads or filaments that have been vulcanized by means of a halogenated p-benzoquinone.

46. A fabric material comprising metallic threads associated with fibre-covered latex threads or filaments that have been vulcanized by means of a halogenated p-benzoquinone.

HARRY L. FISHER.